(12) United States Patent
Porte et al.

(10) Patent No.: US 8,794,572 B2
(45) Date of Patent: Aug. 5, 2014

(54) AIR INTAKE OF AN AIRCRAFT NACELLE THAT INCORPORATES A REINFORCED LIP WITH A DEFROST SYSTEM BY JOULE-EFFECT

(75) Inventors: Alain Porte, Colomiers (FR); Frederic Chelin, Encausse (FR)

(73) Assignee: Airbus Operations S.A.S., Toulouse (FR)

( * ) Notice: Subject to any disclaimer, the term of this patent is extended or adjusted under 35 U.S.C. 154(b) by 72 days.

(21) Appl. No.: 13/523,282

(22) Filed: Jun. 14, 2012

(65) Prior Publication Data

US 2012/0318924 A1    Dec. 20, 2012

(30) Foreign Application Priority Data

Jun. 17, 2011   (FR) ...................................... 11 55332

(51) Int. Cl.
*B64D 15/12*    (2006.01)
(52) U.S. Cl.
USPC .................... 244/134 D; 244/1 N; 244/134 B
(58) Field of Classification Search
USPC ............. 244/134 D, 134 B, 134 C, 1 N, 53 B
See application file for complete search history.

(56) References Cited

U.S. PATENT DOCUMENTS

| | | | | |
|---|---|---|---|---|
| 5,427,332 A | * | 6/1995 | Rauckhorst et al. | 244/134 A |
| 5,947,418 A | * | 9/1999 | Bessiere et al. | 244/134 D |
| 5,971,323 A | * | 10/1999 | Rauch et al. | 244/134 D |
| 6,123,170 A | | 9/2000 | Porte et al. | |
| 6,338,455 B1 | * | 1/2002 | Rauch et al. | 244/134 D |
| RE38,024 E | * | 3/2003 | Adams et al. | 244/134 D |
| 7,780,117 B2 | * | 8/2010 | Botura et al. | 244/134 D |
| 7,923,668 B2 | * | 4/2011 | Layland et al. | 219/535 |
| 8,448,901 B2 | * | 5/2013 | Porte et al. | 244/134 B |
| 2002/0139899 A1 | * | 10/2002 | Porte | 244/134 B |
| 2002/0139900 A1 | * | 10/2002 | Porte et al. | 244/134 C |
| 2004/0094359 A1 | * | 5/2004 | Porte et al. | 181/214 |
| 2005/0006529 A1 | * | 1/2005 | Moe et al. | 244/134 D |

(Continued)

FOREIGN PATENT DOCUMENTS

| | | |
|---|---|---|
| EP | 0 898 063 A1 | 2/1999 |
| EP | 1 845 018 A2 | 10/2007 |

(Continued)

OTHER PUBLICATIONS

French Search Report, dated Jan. 5, 2012, from corresponding French application.

*Primary Examiner* — Christopher P Ellis
*Assistant Examiner* — Medhat Badawi
(74) *Attorney, Agent, or Firm* — Young & Thompson

(57) ABSTRACT

An air intake of an aircraft nacelle includes:
on the one hand, a lip (42) that is defined by a wall (52) whose surface that is in contact with the aerodynamic flows is extended on the inside of the nacelle by an inside wall (44) that borders a pipe that empties out at a power plant and on the outside of the nacelle by an outside wall (46), and, on the other hand, a surface-type Joule-effect defrosting system (58); at least a first alveolar structure (60.1) that is made of a material that conducts the heat and that is flattened against the inside surface of the wall (52) and inserted between the wall (52) and the defrosting system (58), and at least one second alveolar structure (60.2) that is made of composite material that is adjacent to the first structure (60.1).

18 Claims, 3 Drawing Sheets

(56) References Cited

U.S. PATENT DOCUMENTS

| | | | |
|---|---|---|---|
| 2005/0269443 A1* | 12/2005 | Porte | 244/53 B |
| 2007/0102582 A1* | 5/2007 | Botura et al. | 244/134 D |
| 2008/0179448 A1* | 7/2008 | Layland et al. | 244/1 N |
| 2009/0108134 A1* | 4/2009 | Thodiyil et al. | 244/134 B |
| 2009/0314899 A1* | 12/2009 | Porte et al. | 244/53 B |
| 2010/0155538 A1* | 6/2010 | Calder et al. | 244/134 D |
| 2010/0199629 A1* | 8/2010 | Chene et al. | 60/39.093 |
| 2010/0252685 A1* | 10/2010 | Porte et al. | 244/134 B |
| 2010/0294882 A1* | 11/2010 | Gantie et al. | 244/1 N |
| 2010/0301161 A1* | 12/2010 | Chene et al. | 244/1 N |
| 2010/0314082 A1* | 12/2010 | Porte et al. | 165/157 |
| 2011/0036950 A1* | 2/2011 | Guillermond et al. | 244/134 R |
| 2011/0114787 A1* | 5/2011 | Porte et al. | 244/1 N |
| 2011/0139927 A1* | 6/2011 | Porte et al. | 244/1 N |
| 2011/0139940 A1* | 6/2011 | Porte et al. | 244/53 B |
| 2011/0168839 A1* | 7/2011 | Porte et al. | 244/1 N |
| 2011/0168852 A1* | 7/2011 | Porte et al. | 244/53 B |
| 2012/0048389 A1* | 3/2012 | Chelin et al. | 137/15.1 |
| 2012/0090695 A1* | 4/2012 | Porte et al. | 137/15.1 |

FOREIGN PATENT DOCUMENTS

| | | |
|---|---|---|
| FR | 2 904 604 A1 | 2/2008 |
| FR | 2 908 737 A1 | 5/2008 |
| FR | 2 930 234 A1 | 10/2009 |
| WO | 2006/136748 A2 | 12/2006 |

* cited by examiner

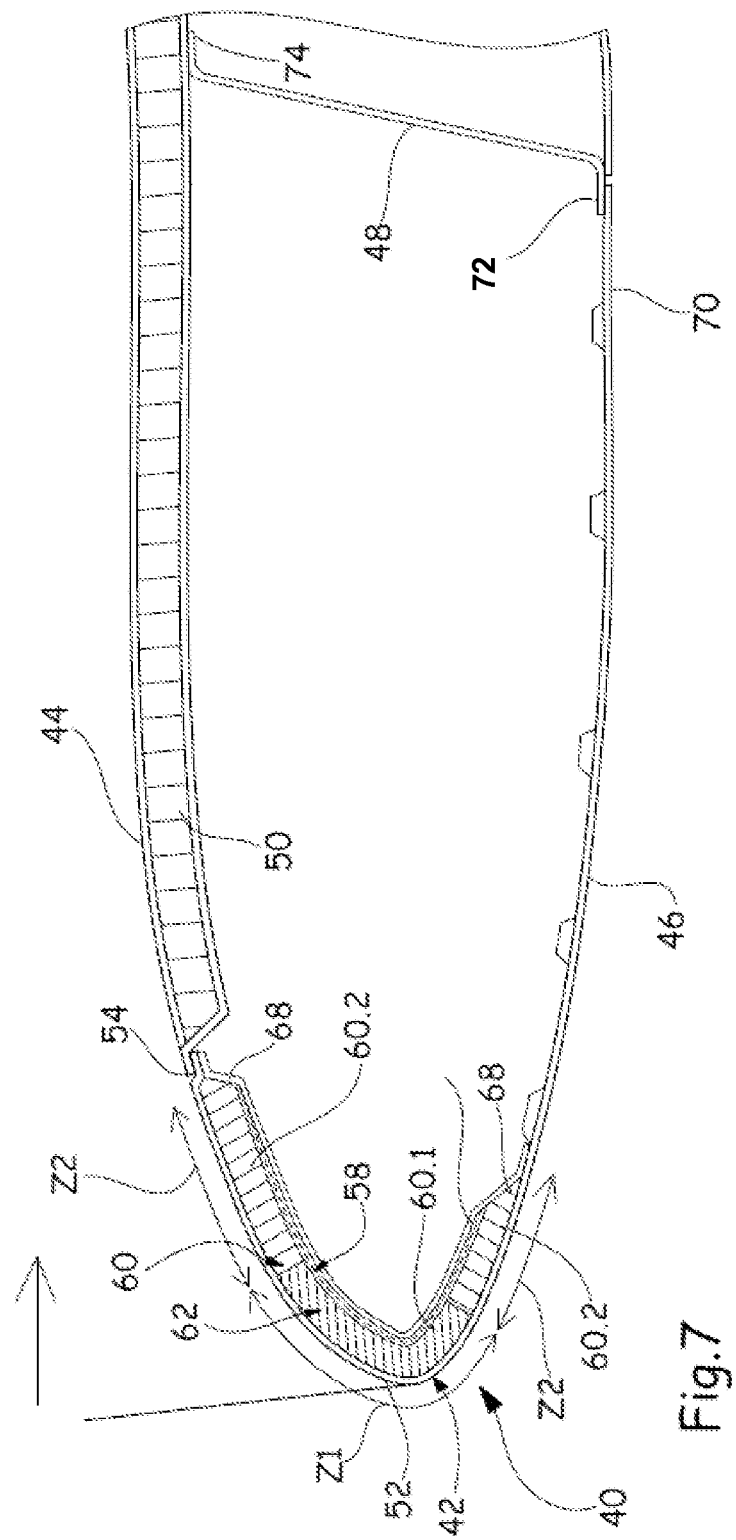

AIR INTAKE OF AN AIRCRAFT NACELLE THAT INCORPORATES A REINFORCED LIP WITH A DEFROST SYSTEM BY JOULE-EFFECT

BACKGROUND OF THE INVENTION

1. Field of the Invention

This invention relates to an air intake of an aircraft nacelle that incorporates a reinforced lip with a Joule-effect defrosting system.

2. Description of the Related Art

An aircraft propulsion system comprises a nacelle in which a power plant is arranged in an essentially concentric manner.

Figure 1:
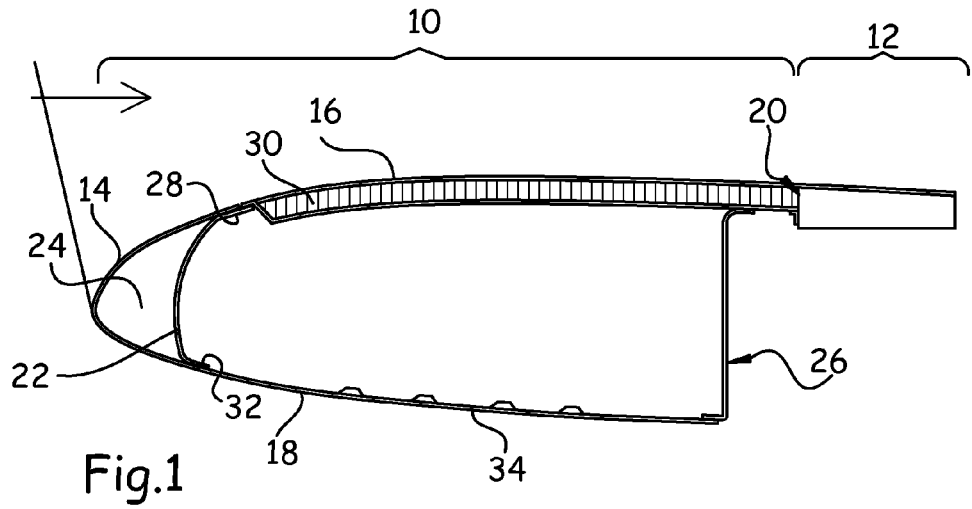

As illustrated in FIG. 1, at the front, the nacelle comprises an air intake 10 that makes it possible to channel an air flow in the direction of the power plant 12. It comprises a lip 14 whose surface that is in contact with the aerodynamic flows is extended on the inside of the nacelle by an inside wall 16 that borders a pipe and on the outside of the nacelle by an outside wall 18.

The air intake 10 is connected to the power plant 12 at a junction surface 20 by any suitable means. The junction surface 20 is essentially planar and perpendicular to the longitudinal axis of the nacelle.

On the structural plane, the air intake 10 comprises a first frame called a front frame 22 that connects the inside wall 16 and the outside wall 18 and that with the lip 14 borders an annular pipe 24 as well as a second frame called a rear frame 26 that connects the inside wall 16 and the outside wall 18 close to the junction surface 20 of the power plant.

Relative to the rear frame 26, the latter ensures the uptake of flexural forces, rotational forces, etc., that are applied to the air intake, such as, for example, the weight of the air intake, and the forces induced by the aerodynamic flows. This rear frame 26 is arranged in a plane that is essentially perpendicular to the longitudinal direction of the nacelle.

A rear frame is described in particular in the document FR-2,904,604.

Relative to the front frame 22, at the inside wall, the latter comprises an edge 28 that is curved toward the rear of the nacelle against which an edge of a panel that forms the lip 14 and an edge of another panel 30 that forms the inside wall 16 are flattened, whereby said edges are placed end-to-end. Advantageously, the panel 30 ensures the acoustic treatment and comprises an alveolar structure, imparting a certain rigidity thereto.

In addition, at the outside wall 18, the front frame 22 comprises an edge 32 that is curved toward the rear of the nacelle, against which at least a portion of the panel that forms the lip is flattened. According to a first variant that is illustrated in FIG. 1, the outside wall 18 is formed by a panel 34 that is independent of the panel that forms the lip 14. In this case, the adjacent edges of the panel 34 and the panel that forms the lip 14 are placed end-to-end and flattened against the curved edge 32. The panel that forms the lip 14 is generally metal in order to be compatible with a system for treating frost or ice, using the hot air that is provided at the air intake and the panel 34 made of composite material to reduce the on-board weight.

Figure 2:
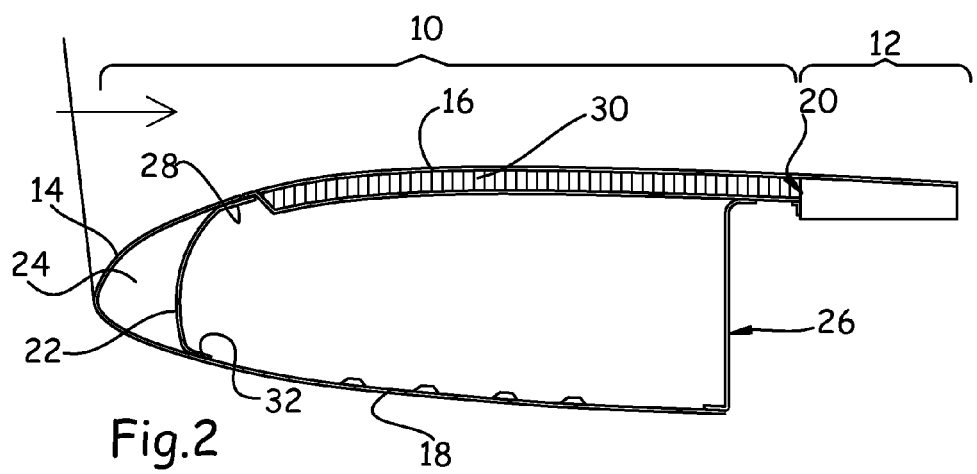

According to another variant that is illustrated in FIG. 2, the panel that forms the lip 14 can extend beyond the front frame 22 and extend up to the rear frame 26 in such a way as to form the outside wall 18 as well. Relative to the variant that is illustrated in FIG. 1, this solution makes it possible to improve the aerodynamic characteristics by eliminating the junction zone between the panels placed end-to-end that forms a step that can produce perturbations in the air flows. When the panel is metal and the air intake comprises a defrosting system that uses hot air, for example, this solution makes it possible to increase the surface that is treated on the defrosting plane using the thermal conductivity of the panel. However, this solution has the drawback of increasing the on-board weight.

Even if the panel that forms the lip 14 extends beyond the front frame 22 and extends up to the rear frame 26 in such a way as to also form the outside wall 18, the presence of a front frame 22 is essential because the latter makes it possible, on the one hand, to border an annular pipe for channeling the hot air that is used for defrosting, and, on the other hand, to ensure the mechanical strength by forming a second barrier behind the lip in the event of a bird strike.

As far as defrosting is concerned, there is another solution that does not use hot air, consisting in connecting electrical resistors 36 at the skin that forms the lip. These electrical resistors come in the form of elements made of conductive material that are arranged in a longitudinal direction and are connected to one another in a mounting in series or in parallel electrically.

According to one embodiment, the electrical resistors are flattened against the inside surface of the panel that forms the lip 14 of which the other surface is in contact with the aerodynamic flows.

Even if this type of defrosting does not use hot air, the front frame 22 is, however, necessary for ensuring the mechanical strength.

According to another aspect, the lip 14 experiences numerous small impacts that can generate delamination phenomena between the panel that forms the lip 14 and the electrical resistors 36, in particular in the impact zone. The delamination phenomena lead to the appearance of an air knife between the electrical resistors 36 and the panel that forms the lip 14 that disrupts the defrosting. Actually, this air knife generates a superheating of the electrical resistor(s) 36 at the delamination zone that can even rupture the electrical resistor(s) 36 at the superheating zone, which leads to no longer having the defrosting function on the zone that is covered by said electrical resistor(s) 36. Furthermore, the air knife forms an insulating layer although the defrosting system is no longer adequately sized in the delamination zone, and consequently, the defrosting is inadequate in this zone.

SUMMARY OF THE INVENTION

Also, the purpose of this invention is to remedy the drawbacks of the prior art by proposing an air intake of a reinforced aircraft nacelle that comprises a Joule-effect defrosting. According to another objective, the invention proposes an input of resistant air without a front frame.

For this purpose, the invention has as its object an air intake of an aircraft nacelle that comprises, on the one hand, a lip that is defined by a wall whose surface that is in contact with the aerodynamic flows is extended on the inside of the nacelle by an inside wall that borders a pipe that empties out at a power plant and on the outside of the nacelle by an outside wall, and, on the other hand, a surface-type Joule-effect defrosting system, characterized in that it comprises at least a first alveolar structure that is made of a material that conducts the heat and that is flattened against the inside surface of the wall and inserted between said wall and the defrosting system and at least a second alveolar structure that is made of composite material that is adjacent to the first structure.

BRIEF DESCRIPTION OF THE DRAWING FIGURES

Figure 3:
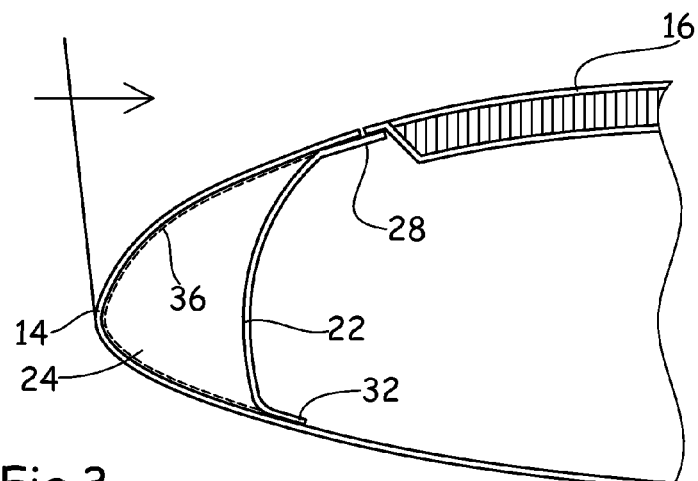
Figure 4:
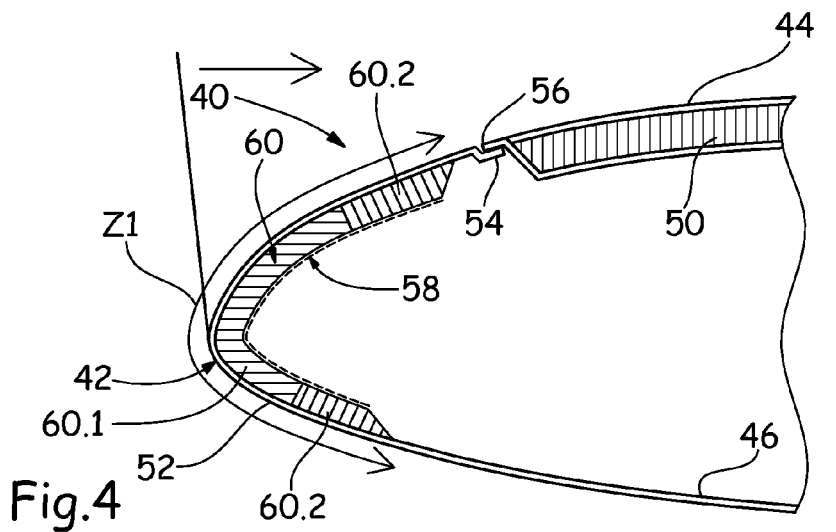
Figure 5:
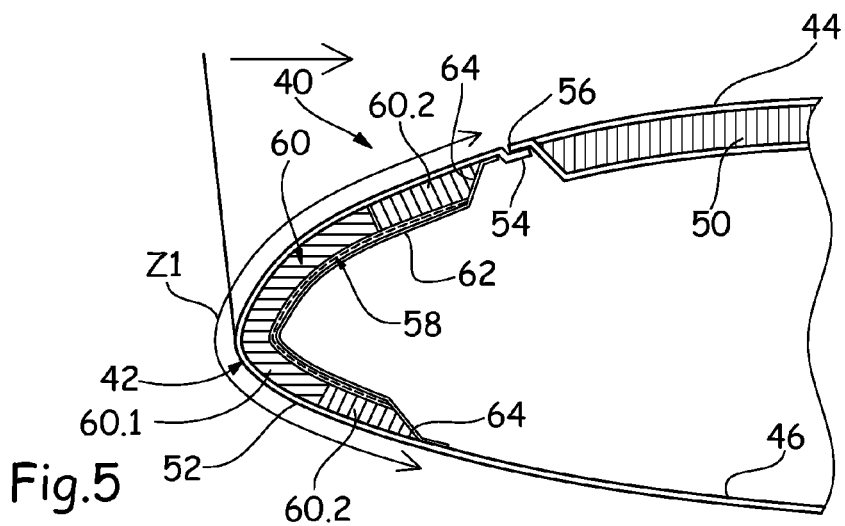
Figure 6:
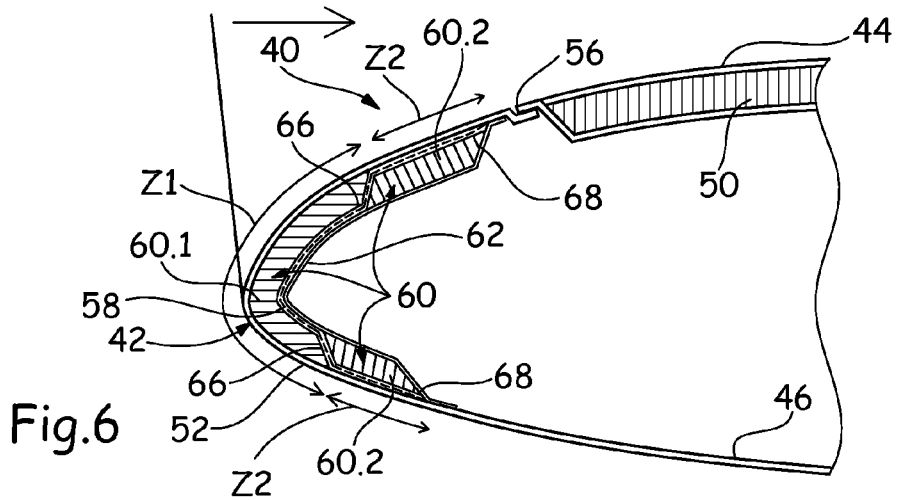

Other characteristics and advantages will emerge from the following description of the invention, a description that is provided only by way of example, relative to the accompanying drawings, in which:

FIG. 1 is a cutaway of an air intake according to a first variant of the prior art, FIG. 2 is a cutaway of an air intake according to a second variant of the prior art, FIG. 3 is a cutaway of an air intake according to a third variant of the prior art that integrates an electrical-type defrosting system, FIG. 4 is a cutaway of a part of an air intake according to a first variant of the invention that integrates an improved electrical-type defrosting system, FIG. 5 is a cutaway of a part of an air intake according to another variant of the invention that integrates an improved electrical-type defrosting system, FIG. 6 is a cutaway of a part of an air intake according to another variant of the invention that integrates an improved electrical-type defrosting system, and FIG. 7 is a cutaway of an air intake according to the invention.

DETAILED DESCRIPTION OF THE INVENTION

FIGS. 4 and 7 show a nacelle with an air intake 40 at the front that makes it possible to channel an air flow in the direction of a power plant, with a first portion of the incoming air flow, called the primary flow, that passes through the power plant to take part in the combustion process, with the second portion of the air flow, called the secondary flow, being entrained by a fan and flowing into an annular pipe that is bordered by the inside wall of the nacelle and the outside wall of the power plant. Hereinafter, the longitudinal axis of the nacelle corresponds to the axis of rotation of the power plant. The front of the nacelle corresponds to the location where the flow penetrates the interior of the nacelle, and the rear of the nacelle corresponds to the location where the flow exits from the nacelle.

The air intake 40 comprises a lip 42 whose surface that is in contact with the aerodynamic flows is extended on the inside of the nacelle by an inside wall 44 that borders a pipe and on the outside of the nacelle by an outside wall 46.

The air intake 40 is connected to the power plant by any suitable means.

On the structural plane, the air intake 40 comprises a frame that is called a rear frame 48 (visible only in FIG. 7) that connects the inside wall 44 and the outside wall 46 close to the junction zone to the power plant.

Advantageously, the inside wall comprises a panel 50 that provides an acoustic treatment.

The panel 50, the power plant, the junction zone of the air intake and the power plant are not described in more detail because they are known to one skilled in the art and are not the essential elements of the invention.

According to one embodiment, the lip 42 comprises a wall 52 that extends over the entire circumference, with a C-shaped profile in a cutting plane that contains the longitudinal axis of the nacelle. A first end 54 of the wall 52 is connected by any suitable means to the pipe 44. Preferably, the wall 52 comprises an offset 56 at the end 54 in such a way as to accommodate the end of the inside wall 44 so that the outside surface of the wall 52 is in the extension of the outside surface of the wall 44. However, other arrangements can be considered to ensure the connection between the walls 44 and 52.

The wall 52 can comprise a single panel that is shaped or several panels that are shaped and assembled in such a way as to form a wall with a C-shaped cross-section that extends over the entire periphery of the air intake.

The invention is now described for a cross-section of the air intake that contains the axis of the nacelle. This cross-section is essentially identical to the entire circumference of the air intake.

According to the invention, the air intake of an aircraft nacelle comprises a Joule-effect defrosting system 58 and an alveolar structure 60 that is made of a material that conducts the heat and that is flattened against the inside surface of the wall 52 and inserted between said wall 52 and the defrosting system 58.

The Joule-effect defrosting system 58 comprises at least one electrically conductive element. According to one embodiment, the Joule-effect defrosting system 58 comprises a single conductive element in the form of a coil that extends over the entire zone to be treated or several linear conductive elements connected according to a mounting in series or in parallel. As a variant, the Joule-effect defrosting system can comprise at least one conductive layer.

The Joule-effect defrosting system is not presented in more detail because it is known to one skilled in the art and can assume different configurations. By way of example, it is described in particular in the document FR-2,908,737.

In all of the cases, the Joule-effect defrosting system is of the surface type and comprises at least one flexible element.

The alveolar structure can come in the form of a honeycomb.

The fact of providing an alveolar structure 60 that is flattened against the wall 52 makes it possible to limit the risks of delamination in the event of small impacts and the appearance of an air knife between the wall 52 and the alveolar structure 60.

Even if, because of a more significant impact, the wall 52 becomes detached by delamination at the zone of impact of the alveolar structure 60, with the alveolar structure 60 being rigid, the risks of delamination between the alveolar structure 60 and the Joule-effect defrosting system 58 are zero, although the latter does not run the risk of being damaged because of superheating.

According to another aspect, the presence of the alveolar structure 60 tends to increase the rigidity of the lip, although it is possible to eliminate the front frame.

According to another point, it is possible to compensate for the increase of the on-board weight because of the presence of an alveolar structure 60 by reducing the thickness of the wall 52.

According to one embodiment, the wall 52 and the alveolar structure 60 are metal and made with the same material so as to limit the risks of galvanic corrosion. Advantageously, the wall 52 and the alveolar structure 60 are made of an aluminum alloy.

To form a barrier in the case of a bird strike, the air intake comprises a shock absorber in the form of a skin 62 that is glued against the Joule-effect defrosting system 58, as illustrated in FIGS. 5 to 7. According to one embodiment, this skin 62 comes in the form of a layer that is based on fibers marketed under the trademark Kevlar®. This arrangement makes it possible to increase the rigidity of the lip 42. Advantageously, the rear skin 62 extends beyond the zone that is covered by the alveolar structure 60 in such a way as to be connected to the wall 52 on both sides of the alveolar structure

60. This solution makes it possible to obtain a sandwich structure that contributes to improving the mechanical characteristics of the lip 42.

Preferably, the free edges 64 of the alveolar structure 60 have a beveled shape in such a way as to ensure a better passage of the forces between the rear skin 62 and the wall 52.

According to the variants, the alveolar structure 60 can extend over the entire height of the air intake, or only over a portion of this height.

Height of the air intake is defined as the distance that separates the inside wall 44 and the outside wall 46 at the location that is occupied by a front frame according to the prior art.

The alveolar structure extends over a zone Z1 that corresponds to at least ⅔ of the height of the air intake. This zone corresponds to the zone where the impacts have a small angle of incidence.

According to one variant, the alveolar structure extends over a zone Z1 that corresponds to approximately ⅔ of the height of the air intake, as illustrated in FIGS. 6 and 7.

According to other variants, the alveolar structure 60 can extend over a zone Z1 that is greater than ⅔ of the height of the air intake, as illustrated in FIGS. 4 and 5.

As appropriate, the zone Z1 may or may not be centered relative to the point of the nacelle that is the farthest to the front.

In this zone Z1, the alveolar structure is sized essentially for the mechanical strength, in particular for its compression strength.

Thus, the cells of the alveolar structure have a cross-section on the order of 2 to 3 mm.

According to another characteristic of the invention, the air intake can comprise several alveolar structures 60.1 and 60.2 with different characteristics that are juxtaposed with one another.

In the zone Z1 that corresponds to approximately ⅔ of the height of the air intake, the alveolar structure 60.1 is sized essentially for the mechanical strength, in particular for its compression strength, whereas in the at least one zone Z2 that is adjacent to the zone Z1, the alveolar structure(s) 60.2 is (are) sized essentially for the acoustic characteristics. Preferably, the air intake comprises two alveolar structures 60.1 and 60.2 that are arranged on both sides of the alveolar structure 60.1.

This solution makes it possible to optimize the characteristics of the alveolar structures based on their positions and thus to optimize the on-board weight.

By way of illustration, in the zone Z1, the cells of the alveolar structure 60.1 have a cross-section on the order of 2 to 3 mm, whereas in the zone Z2, the cells of the alveolar structures 60.2 have a cross-section on the order of 10 to 12 mm.

According to a first variant that is illustrated in FIG. 7, the alveolar structures 60.1 and 60.2 are made of the same electrically conductive material, in particular based on an aluminum alloy.

According to another variant that is illustrated in FIG. 6, the alveolar structure 60.1 is made of a conductive material, in particular based on an aluminum alloy, and the alveolar structure(s) 60.2 are made of composite material, non-conductive, in particular in honeycomb form marketed under the trademark Nomex®.

According to this variant, in the zone Z1, the Joule-effect defrosting system 58 is flattened against the surface of the alveolar structure 60.1 that is opposite to the wall 52, and in the zones Z2, it is flattened against the inside surface of the wall 52, inserted between said wall and the alveolar structures 60.2. Advantageously, the edges 66 of the alveolar structure 60.1 and the adjacent alveolar structures 60.2 have complementary beveled shapes so that the Joule-effect defrosting system 58 is not flattened against an edge that borders two surfaces at 90° for limiting the risk of damage to said defrosting system 58. In addition, the free edges 68 of the alveolar structures 60.2 have a beveled shape in such a way as to ensure a passage of forces between the rear skin 62 and the wall 52.

As indicated above, the design of the lip 14 according to the invention makes it possible to eliminate the front frame.

According to another characteristic of the invention, the second end 70 of the wall 52 that forms the lip 42 extends up to the rear frame 48. To ensure a better uptake of forces, the rear frame is tilted, and its outside edge 72 is offset toward the front of the nacelle relative to its inside edge 74.

Beyond the zones that are covered by the alveolar structure(s) 60, 60.1, 60.2, the wall 52 can comprise reinforcements 76 that are connected at the inside surface of said wall 52. Preferably, these reinforcements 76 are arranged in planes that are essentially perpendicular to the longitudinal axis.

The invention claimed is:

1. An air intake of an aircraft nacelle comprising:
   a lip (42) that is defined by a wall (52) having a surface that is in contact with aerodynamic flows, the lip being extended on an inside of the nacelle by an inside wall (44) that borders a pipe that empties out at a power plant;
   an outside wall (46);
   a surface Joule-effect defrosting system (58);
   at least a first alveolar structure (60.1) that is made of a material that conducts heat that is flattened against an inside surface of the wall (52) and inserted between said wall (52) and the defrosting system (58); and
   at least two second alveolar structures (60.2) that are made of composite material, the at least two second alveolar structures being adjacent to the first alveolar structure (60.1), the at least two second alveolar structures (60.2) being flattened against the inside surface of the wall (52), with the defrosting system (58) being inserted between the at least two second alveolar structures (60.2) and said wall (52), wherein
   the first alveolar structure (60.1) is in a zone Z1 that corresponds to approximately ⅔ of a height of the air intake that is sized for mechanical strength, and at least of the second alveolar structures (60.2) is in at least one zone Z2 that is adjacent to the zone Z1.

2. The air intake of an aircraft nacelle according to claim 1, wherein a shock absorber in the form of a skin (62) is attached to the Joule-effect defrosting system (58).

3. The air intake of an aircraft nacelle according to claim 2, wherein the skin (62) comes in the form of a fiber-based layer.

4. The air intake of an aircraft nacelle according to claim 1, wherein the first alveolar structure (60.1) that is made of a heat-conductive material extends over a zone Z1 that corresponds to at least ⅔ of the height of the air intake.

5. The air intake of an aircraft nacelle according to claim 1, wherein the first alveolar structure in the zone Z1 is made of a conductive material, and the at least one of the second type of alveolar structures (60.2) is in the zone(s) Z2 made of composite material, and wherein the Joule-effect defrosting system (58) is flattened against the surface of the first alveolar structure (60.1) that is opposite to the wall (52) in the zone Z1 and flattened against the inside surface of the wall 52, inserted between said wall and the second alveolar structure(s) (60.2) in the zone(s) Z2.

6. The air intake of an aircraft nacelle according to claim 4, wherein edges (66) of the first alveolar structure (60.1) and adjacent second alveolar structures (60.2) have complementary beveled shapes.

7. The air intake of an aircraft nacelle according to claim 1, wherein free edges of the alveolar structure(s) have a beveled shape.

8. An aircraft nacelle that incorporates an air intake according to claim 1, wherein the nacelle comprises a rear frame (48) at a junction plane between said air intake and a power plant that is connected to the wall (52) that borders the lip (42).

9. The aircraft nacelle according to claim 8, wherein the rear frame is tilted, and the frame has an outside edge (72) offset toward a front of the nacelle relative to an inside edge (74) of the frame.

10. The air intake of an aircraft nacelle according to claim 1, wherein a shock absorber in the form of a skin (62) is attached to the Joule-effect defrosting system (58).

11. The air intake of an aircraft nacelle according to claim 1, wherein cells of the first alveolar structure (60.1) have a cross-section of 2 mm to 3 mm.

12. The air intake of an aircraft nacelle according to claim 1, wherein cells of each second alveolar structure (60.2) have a cross-section of 10 mm to 12 mm.

13. The air intake of an aircraft nacelle according to claim 1, wherein the first alveolar structure (60.1) is formed from conductive aluminum alloy, and each second alveolar structure (60.2) is a non-conductive honeycomb of conductive material.

14. An air intake of an aircraft nacelle comprising:
a lip (42) that is defined by a wall (52) having a surface that is in contact with aerodynamic flows, the lip being extended on an inside of the nacelle by an inside wall (44) that borders a pipe that empties out at a power plant;
an outside wall (46);
a surface Joule-effect defrosting system (58);
at least a first alveolar structure (60.1) that is made of a material that conducts heat that is flattened against an inside surface of the wall (52) and inserted between said wall (52) and the defrosting system (58); and
at least two second alveolar structures (60.2) that are made of composite material, the at least two second alveolar structures being adjacent to the first alveolar structure (60.1), the at least two alveolar structures having cells with a diameter that is different from that of the first alveolar structure, the at least two second alveolar structures (60.2) being flattened against the inside surface of the wall (52), with the defrosting system (58) being inserted between the at least two second alveolar structures (60.2) and said wall (52),
wherein edges (66) of the first alveolar structure (60.1) and adjacent second alveolar structures (60.2) have complementary beveled shapes so that the Joule-effect defrosting system is not flattened against an edge that borders two surfaces, and
the first alveolar structure (60.1) is in a zone Z1 that corresponds to approximately ⅔ of a height of the air intake that is sized for mechanical strength, and at least of the second alveolar structures (60.2) is in a or in at least one zone Z2 that is adjacent to the zone Z1.

15. The air intake of an aircraft nacelle according to claim 14, wherein a shock absorber in the form of a skin (62) is attached to the Joule-effect defrosting system (58).

16. The air intake of an aircraft nacelle according to claim 15, wherein the skin (62) comes in the form of a fiber-based layer.

17. The air intake of an aircraft nacelle according to claim 14, wherein the first alveolar structure (60.1) that is made of a heat-conductive material extends over a zone Z1 that corresponds to at least ⅔ of the height of the air intake.

18. The air intake of an aircraft nacelle according to claim 14, wherein the first alveolar structure in the zone Z1 is made of a conductive material, and the at least one of the second type of alveolar structures (60.2) is in the zone(s) Z2 is made of composite material, and wherein the Joule-effect defrosting system (58) is flattened against the surface of the first alveolar structure (60.1) that is opposite to the wall (52) in the zone Z1 and flattened against the inside surface of the wall 52, inserted between said wall and the second alveolar structure (s) (60.2) in the zone(s) Z2.

* * * * *